(12) United States Patent
Shade et al.

(10) Patent No.: US 11,485,054 B2
(45) Date of Patent: Nov. 1, 2022

(54) EQUIPMENT COVER WITH TEXTURED OUTER SURFACE

(71) Applicant: CENTRICA HIVE LIMITED, Windsor (GB)

(72) Inventors: Philip Shade, Windsor (GB); Tom Guy, Windsor (GB); Jessica Kyte, Windsor (GB); Elvin Nagamootoo, Windsor (GB)

(73) Assignee: Centrica Connected Home Limited, Windsor (GB)

( * ) Notice: Subject to any disclaimer, the term of this patent is extended or adjusted under 35 U.S.C. 154(b) by 429 days.

(21) Appl. No.: 16/331,954

(22) PCT Filed: Sep. 8, 2017

(86) PCT No.: PCT/GB2017/052626
§ 371 (c)(1),
(2) Date: Mar. 8, 2019

(87) PCT Pub. No.: WO2018/046935
PCT Pub. Date: Mar. 15, 2018

(65) Prior Publication Data
US 2019/0232534 A1 Aug. 1, 2019

(30) Foreign Application Priority Data

Sep. 9, 2016 (GB) ..................... 1615393

(51) Int. Cl.
*B29C 37/00* (2006.01)
*B29C 45/37* (2006.01)
(Continued)

(52) U.S. Cl.
CPC ...... *B29C 37/0028* (2013.01); *B29C 45/0053* (2013.01); *B29C 45/372* (2013.01);
(Continued)

(58) Field of Classification Search
None
See application file for complete search history.

(56) References Cited

U.S. PATENT DOCUMENTS

| 5,338,646 A | * | 8/1994 | Nakayama | ............. | G11B 7/244 |
| | | | | | 346/135.1 |
| 2008/0145472 A1 | * | 6/2008 | Oikawa | ................... | B29C 33/38 |
| | | | | | 425/556 |

(Continued)

FOREIGN PATENT DOCUMENTS

| CN | 101722615 A | 6/2010 |
| EP | 1669191 A1 | 6/2006 |

(Continued)

OTHER PUBLICATIONS

PCT International Search Report and Written Opinion, PCT Application No. PCT/GB2017/052626, dated Nov. 22, 2017, 9 pages.

(Continued)

*Primary Examiner* — Kelly M Gambetta
*Assistant Examiner* — Virak Nguon
(74) *Attorney, Agent, or Firm* — Fenwick & West LLP

(57) ABSTRACT

The present invention relates to equipment covers. More particularly, the present invention relates to a method of making an equipment cover, the method comprising: moulding a cover from a substantially transparent or translucent polymer, optionally a thermoplastic polymer, to form a cover having a textured outer surface and a generally smoother inner surface; and applying a coating having reflective components to the inner surface.

19 Claims, 5 Drawing Sheets

(51) Int. Cl.
  B29C 45/00  (2006.01)
  B29K 69/00  (2006.01)
(52) U.S. Cl.
  CPC .......... *B29C 2037/0035* (2013.01); *B29C 2045/0079* (2013.01); *B29K 2069/00* (2013.01); *B29K 2995/003* (2013.01); *B29K 2995/0025* (2013.01); *B29K 2995/0026* (2013.01); *B29K 2995/0029* (2013.01)

(56) References Cited

U.S. PATENT DOCUMENTS

| | | | |
|---|---|---|---|
| 2011/0262713 A1 | 10/2011 | Nakao et al. | |
| 2012/0129090 A1* | 5/2012 | Mamak | C01G 41/00 430/108.6 |
| 2015/0173222 A1 | 6/2015 | Demers et al. | |

FOREIGN PATENT DOCUMENTS

| | | | | |
|---|---|---|---|---|
| EP | 2179833 A1 | 4/2010 | | |
| EP | 2668527 B1 | 12/2018 | | |
| JP | 03167238 A | * 7/1991 | | |
| JP | 2016-022615 A | 2/2016 | | |
| WO | WO-2008059671 A1 | * 5/2008 | ............ | B29C 33/38 |
| WO | WO 2008/079589 A1 | 7/2008 | | |
| WO | WO 2015/123041 A1 | 8/2015 | | |

OTHER PUBLICATIONS

GB Search Report Under Section 17(5), GB Application No. GB1615393.4, dated Mar. 9, 2017, 4 pages.

The State Intellectual Property Office of People's Republic of China, The First Office Action, CN Patent Application No. 201780069103.5, dated Nov. 4, 2020, 15 pages.

* cited by examiner

EQUIPMENT COVER WITH TEXTURED OUTER SURFACE

RELATED APPLICATIONS

This application is a 35 U.S.C. 371 national stage filing of International Application No. PCT/GB2017/052626, filed on Sep. 8, 2017, which claims priority from United Kingdom Application No. GB1615393.4 filed on Sep. 9, 2016. The contents of the aforementioned applications are hereby incorporated by reference in their entireties.

The present invention relates to equipment covers. More particularly, the present invention relates to covers or housings for user devices, such as electrical devices and Internet of Things (IoT) devices.

Various equipment covers exist, made out of different materials. Some equipment covers are made of metal, which may be anodized, e.g. anodized aluminium. Other equipment covers can be plastic.

These equipment covers can be left with their natural colour (e.g. in the case of metal covers), or may be coloured by printing or dying. Plastics can be coloured by adding pigment to plastics during a heating process (sometimes known as masterbatch), by compounding colourant into a polymer based, or by coating the outside surface of the plastic with a coloured coating.

SUMMARY OF THE INVENTION

Aspects of the invention are set out in the independent claims and preferred features are set out in the dependent claims.

There is described herein a method of making an equipment cover or faceplate, the method comprising: moulding a cover from a substantially transparent or translucent polymer, optionally comprising a thermoplastic polymer, to form a cover or faceplate having a textured outer surface and a generally smoother inner surface; and applying a coating having reflective components to the inner surface.

Such a method can provide a cover for a piece of equipment that is lightweight, durable and has a feeling of depth. In addition, the method can make such a cover easy to manufacture and/or easily reproducible. Moulding a cover from a polymer provides a simple manufacturing process, which can be easy to reproduce consistently, and provides a cover that can be lightweight and durable.

By providing a clear or substantially translucent/transparent polymer cover and applying a reflective coating to an inner surface, the coating can be protected, e.g. the coating may be shielded from wear, so that it is more durable and less susceptible to scratches, even if a further protective coating is not applied. Thus it is possible to impart reflectivity to the cover without dispersing pigment or reflective particles within the polymer, which removes complexity in the manufacture process.

Although some light will be reflected from the outer textured surface of the cover, because the polymer is substantially translucent/transparent, the majority of the visible light incident on the cover will pass through the polymer, onto the coating on the inner surface. The light which hits the reflective (or pearlescent) components (or at least particular wavelengths of the light) will then be reflected off those components back into the polymer cover and the majority of this reflected light will pass out through the outer textured surface. Thus the reflective components can be viewed from the outside of the cover (i.e. when looking at the cover directly onto the textured outer surface) and the application of the light-reflective coating to the inner surface can provide the cover with a lighter appearance and creates a perception of depth because the reflection comes from below the outer surface of the cover. Properties, further examples and details of the use of reflective components is described in more detail later.

The combination of the textured outer surface changes the direction in which light is reflected from the cover due to refraction of incident light as it enters and leaves the textured outer surface of the polymer cover. This means that light reaching a particular point in space may have originated from a number of different points, and may have been reflected from a number of different, spaced-apart reflective components on the inner surface. This can result in a cover with a total surface reflectivity which changes depending on what angle the cover is viewed from and can create an impression of depth and a perception of solidity.

While the term cover has been used, this apparatus could be a covering, housing, faceplate or a section or part of a cover, housing or faceplate. In some embodiments, equipment or devices will have a main (or primary) cover or housing (typically formed from two or more separate parts, such as a front and a rear housing, although side housings and other combinations are also envisaged), and the cover or component described herein may be provided in addition to these primary covers. The cover or faceplate will in some cases be designed to be fixed on top of a primary or main housing or cover, or in other cases it may be designed to form part of the main housing, for example as a panel in the main housing. In one example, the rear cover of a piece of equipment is a conventional cover, and the front cover is a front panel or face plate formed as described above. When the cover forms only part of an equipment cover, it may comprise, for example, as little as 10% of the total surface area of the device cover or housing.

The reflective components of the coating reflect light in the visible electromagnetic spectrum. The reflective components may reflect just one wavelength, or a range of wavelengths of visible light. These reflective components may give a "metallic" look to the cover. Thus the term "reflective" as used herein may describe materials which appear substantially opaque. In some cases, the reflective components may have a reflectivity of more than 5%, more than 10%, more than 20% or more than 30%. Some reflective components can be used as a colour pigment and/or to accelerate curing and/or drying of paint/lacquer.

In this case, a "textured" surface may, for example, be used to describe surfaces with a texture depth of more than around 1 μm, e.g. the difference between height of highest peak and lowest valley in a reasonable sampling length (e.g. 1 cm) is equal to or greater than around 1 μm (alternatively, the surface roughness, e.g. $R_a$, the mean/average of the absolute values of the vertical deviation of points on the surface from the mean line of the surface profile, may be greater than or equal to 1 μm). The textured outer surface will at least normally be rough in comparison to the wavelengths of light in the visible spectrum, i.e. the height of the surface roughness (the maximum difference between peak heights and valley depths in the surface) is of the same magnitude or greater than that of visible light (~380-700 nm).

The inner surface of the cover is "generally" smoother than the textured outer surface of the cover, in the sense that when taken across a sample size of reasonable area (e.g. 1 cm$^2$, 5 mm$^2$ or 1 mm$^2$), the inner surface is smoother, less rough, or has a smaller roughness average, $R_a$, than the outer surface.

The cover may be used as an outer cover or surface for pieces of user equipment and appliances/devices, such as sensors, thermostats, switches, wall power sockets, plugs, all of which may or may not be "smart" interconnected equipment, communications hubs, signal boosters, and other Internet of Things (IoT) components which a user may install in their premises (home or work) and with which a user may interact.

The cover may be light transmitting in that visible light can be transmitted through at least a portion or a particular layer of the cover (e.g. through the transparent/translucent polymer), but does not necessarily mean that the equipment cover will transmit 100% of all light that is incident on it, or even that any light may pass through the cover completely (e.g. although light may pass through some of the layers of the cover, other layers may be opaque and block light so that no light can pass from one side of the cover to the other).

Preferably, the reflective components comprise more than or equal to 5% and/or less than or equal to 25% by volume of the coating, preferably more than or equal to 10% and/or less than or equal to 20%, more preferably around 15%. In some cases, the reflective components may make up around 15% by mass of the coating. It has been found that this concentration of reflective components in the coating having reflective components, combined with the polycarbonate cover having a textured outer surface, provides a suitable reflectivity to the cover. For example, when combined with polycarbonate of 2-2.5 mm thickness, providing reflective components making up 10% or less by volume of the coating applied directly to the inner surface did not achieve the desired reflectivity characteristics and produced dull/flat results, whilst increasing the concentration of the reflective particles to 20% or more by volume had little effect other than to weaken the laminate strength of the coating layer, and in some cases the layers started to delaminate. In embodiments where the reflective components are suspended in a substantially transparent/translucent formula so that colour placed behind the inner surface of the cover shows through to the outer surface, this concentration of reflective components allows such colour to be imparted to the cover, whilst still creating a shiny, reflective surface.

Preferably, the equipment cover has a reflectivity of more than 20% and/or less than 90%, preferably more than 30% and/or less than 80%, more preferably around 50%. The reflectivity of the equipment cover is determined by the reflectivity and transmissivity of the polymer, the reflectivity of the reflective components within the coating, the reflectivity of the rest of the coating, and the texture or roughness of the outer surface.

As described herein, reflectivity may also be read as reflectance. The measurements herein generally refer to the reflectivity of electromagnetic radiation (light) in the visible spectrum (roughly 380 nm-700 nm) along the normal to the surface. Each reference to reflectivity or reflectance herein may also or alternatively be quantified and expressed in terms of transmittance or transmissivity.

Preferably, the polymer that is moulded to form the cover has a transmissivity of more than 75% and/or less than 98%, preferably more than 85% and/or less than 95%, more preferably between around 87% and 91%. This transmissivity, or transmittance, may be determined, e.g. by the ASTM D1003 method. The transmittance of the polymer may be the transmittance of the polymer that is measured before it has been moulded. For example, it may be the transmittance of polymer pellets prior to moulding into the shape of the cover. In some cases the processing, such as the moulding, may change the transmissivity of the polymer. The surface texture may also alter the transmissivity.

The polymer may have a reflectivity of not more than 20%, and/or at least 2%, more preferably around 10%. The reflective coating may have a reflectivity of at least 10% and/or not more than 40%, preferably around 30%. The reflectivity of the coating may be determined by the size, shape, surface roughness, spatial orientation and concentration of the reflective components.

As described herein, transmissivity, or transmittance, may refer to the percentage of electromagnetic radiation (light) in the visible spectrum (roughly 380 nm-700 nm) which can pass through a material when it is incident along the normal to the surface.

In some embodiments, the coating having reflective components comprises reflective components dispersed within a substantially transparent or translucent coating. By providing a coating that is transparent with reflective components, it is possible to provide covers with a consistently reproducible amount of reflectance, but to allow flexibility in the overall colour imparted to the cover. For example, the manufacture method may include applying a further layer onto the inner surface coating having reflective components, the further layer being selected by virtue of its colour, which would be visible from the outer side of the outer textured surface, through the polymer layer and the inner surface coating.

In one example, after applying the coating having reflective components to the inner surface, a further coating is applied to the inner surface, wherein the further coating is substantially opaque. I.e. this further, or second, coating is applied on top of the first coating having reflective components, so that the first coating having reflective components is sandwiched between the inner surface of the polymer cover and the second, opaque coating. This further opaque coating may be selected for its colour, so as to impart a particular colour to the cover. Thus this is an efficient way to add colour to the cover, in a step which may be separated from the step of adding reflective components.

In a preferred embodiment, moulding a cover from a substantially transparent or translucent polymer comprises moulding the cover in a mould tool, and the method further comprises: texturing a surface of the mould tool corresponding to the textured outer surface of the cover. Texturing the surface of the mould tool, or moulding die, will be performed before the step of moulding the cover from the substantially transparent/translucent polymer. Providing a mould tool with a textured surface means the texturing or surface roughness of the outer surface of the cover can be provided simply by moulding the cover, rather than in a separate step. However, in other embodiments the surface texture of the outer surface of the polymer cover may be added after the cover has been moulded to an appropriate shape for the equipment. The surface texture of the outer surface may thus be achieved by texturing the polymer e.g. by spark erosion or chemical erosion.

Preferably texturing the surface of the mould tool comprises etching the surface by chemical etching. Such chemical etching can create an irregular or uneven surface roughness, which is imparted onto the moulded polymer. The surface roughness can affect the reflectivity of the cover, e.g. a more irregular surface roughness may scatter reflected light more randomly and in more directions. Alternatively, the mould tool may be textured by spark erosion, which may also create an irregular or uneven surface roughness.

In some cases, etching may be performed on the surface of the after the moulding process has been completed, even if the mould itself is textured, for example to improve texture uniformity.

Where moulding the polymer cover comprises moulding the cover in a mould tool, the method may further comprise (prior to moulding the polymer cover) polishing the surface of the mould tool corresponding to the inner surface of the polymer cover to achieve the generally smoother profile or the inner surface. By providing a smoothed or polished inner surface, the coating may be applied more uniformly, and it may be easier to ensure every point of the surface is coated, whilst keeping the thickness of the coating thin. In an alternative embodiment, the method may comprise polishing the inner surface of the moulded cover to provide the generally smoother profile of the inner surface.

In some embodiments, the method may further comprise forming an opening in the polymer cover for exposing an interface element or component. For example, this interface element may be a user interface element such as a button, light, light emitting diode (LED), display, touchscreen or speaker. Alternatively this may be an environmental interface element or component, such as a sensor for sensing heat, light, sound (e.g. microphone) or humidity. In some embodiments, this may be a communication or power element, such as pins or pin sockets for electrical power, sockets for power or data cables (e.g. USB ports).

Applying a coating to the inner surface may comprise not applying the coating to an area of the inner surface, in particular a selected area or areas of the inner surface, where an inner coating is unnecessary or undesirable. One example where it would be unnecessary would be a section that is later going to be removed to allow access through the cover for, for example, inserting an electronics interface. An example of where it would be undesirable would be for allowing a user interface element to be visible. For example a coating may be excluded where a piece of equipment has a user interface element that should be visible through the cover, but does not need to physically interact with the user or another piece of equipment, e.g. light, LED or, display. The coating may also be selectively applied so that only desired portions of the cover are reflective. The method may include omitting to apply only the opaque coating, or also not applying the transparent/translucent coating with reflective components to a particular area of the inner surface of the cover in order to allow the interface component to be visible, or where material will later be removed, or in the case of omitting only the opaque coating, where it may be desired to have a reflective surface but the opaque surface behind this is not required in some local area. In some embodiments, the outer surface of the cover may not be textured in the position of the user interface element to improve visibility, or at the site of material removal to improve efficiency in the process.

Preferably, the method further comprises: before applying a coating having reflective components to the inner surface or before applying an opaque coating, applying a mask, or mask element, to the inner surface or the surface of the coating with reflective elements, corresponding to the area in which coating is not desired, for example for allowing a user interface element to be visible, for material removal, or for which reflectivity but not opacity is desired in certain parts of the cover. Once the coating(s) have been applied, the mask element(s) may be removed.

Preferably, the textured outer surface has a texture depth of more than 1 μm and/or less than 100 μm, preferably of more than 10 μm and/or less than 50 μm, preferably of more than 20 μm and/or less than 40 μm, more preferably around 30 μm. The texture depth is a measurement of the highest peak to lowest valley, for example, the average distance between the highest peak and the lowest valley in a sampling length may be measured. Taking a sampling length of 1 cm, the average distance between the highest peak and the lowest valley may be roughly more than 1 μm and/or less than 100 μm, preferably of more than 10 μm and/or less than 50 μm, preferably of more than 20 μm and/or less than 40 μm, more preferably around 30 μm. In other cases, it may be more convenient to measure the average height of roughness component irregularities from a mean line, $R_a$, which may be approximately more than 1 μm and/or less than 100 μm, preferably of more than 10 μm and/or less than 50 μm, preferably of more than 20 μm and/or less than 40 μm, more preferably around 30 μm.

Preferably, the cover is moulded such that the thickness of the polymer cover between the outer surface and the inner surface is at least 1 mm and/or not more than 5 mm, preferably at least 1.5 mm and/or not more than 3 mm, more preferably around 2 mm to 2.5 mm. This thickness may generally be consistent across at least a substantial proportion, e.g. at least 40%, at least 60% or at least 90%, of the cover. It has been found that this cover thickness provides a cover for a user device or appliance that is robust enough for general use, while remaining relatively lightweight. This thickness of polymer layer is sufficient to protect inner working components of the equipment, such a processing, sensing and power components, while also protecting the coating having reflective components applied to the inner surface.

In preferred embodiments, the thickness of the coating having reflective components is greater than 1 micron, or micrometre, μm, and less than 50 microns, preferably greater than 5 microns and/or less than 30 microns, preferably the coating may be less than or equal to 15 microns. More preferably the coating having reflective components around 8 to 10 microns. For example, the coating have reflective components may be at least 8 microns and not more than 10 microns. The coating may be measured to be 8 microns, 9 microns or 10 microns to the nearest micron. Such a coating thickness can enable a suitable concentration of reflective particles to be applied to the inner surface of the cover to achieve light-reflecting properties, and help to ensure that in spite of any (albeit small) surface roughness on the smoother inner surface of the cover, the coating covers the inner surface completely.

Preferably, the combined thickness of the coating having reflective components and the further coating is equal to or more than 1 micron and less than or equal to 50 microns, preferably greater than or equal to 5 microns or 10 microns, and/or preferably less than or equal to 30 microns. In preferred embodiments, the combined thickness of the coatings is around 20 microns.

In particular embodiments, applying a coating having reflective components comprises: printing an ink having reflective components onto the inner surface, preferably wherein the printing is screen printing. This can be an efficient method of coating the inner surface to ensure uniform coating, and covers made in such a way can be reproduced consistently.

In one example, the reflective components comprise metallic components. The coating having metallic components may be a metallic paint. Alternatives are lacquer and ink.

Preferably, the thermoplastic polymer is a polycarbonate. Polycarbonates can provide a strong, tough cover for the equipment as they are durable and have high impact-resistance. They can also be easily moulded and thermoformed and have good light transmission properties. Alternative polymers that may be suitable include polyester, polypropylene, polyethylene, polyamides, terephthalate, polybutadiene terephthalate, polyether ketones, polyetherimides, polylactams, polystyrene, styrene acrylonitrile, acrylonitrile butadiene terpolymers, polypropylene oxide, nylons, and acrylic.

In some embodiments, the reflective components comprise mica powder, flakes or scrap, preferably pearlescent mica powder. In some embodiments the reflective components are of at least 1 micron in diameter. The reflective components may be less than 40 microns in diameter. In preferred embodiments, the reflective components can at least 5 microns and/or less than 15 microns in diameter, or at least 8 microns and/or less than 12 microns in diameter. More preferably the reflective components are around 10 microns in diameter. For example, the mica powder may be particles of mica of around 10 microns in diameter. Alternatively, metal, metal alloys, graphite glass beads, polymer beads or combinations thereof can be used for the reflective components, and can be in various forms such as flakes, scrap, powder or combinations thereof. As noted above, the components may be applied by mixing them into a lacquer, paint, ink or resin. Suitable metals or metal alloys include aluminium, copper, $SiO_2$, $Al_2O_3$, $Fe_2O_3$, $BiOCl$, $SiO$, $Ti_2O$ and $TiO_2$.

There is also described herein an equipment cover, optionally a light-transmitting equipment cover, comprising: a substantially transparent or translucent polymer cover, optionally comprising a thermoplastic polymer cover, having a textured outer surface and a generally smoother inner surface; and a coating having reflective components provided on the inner surface.

Preferably the cover has a mounting feature or component for fixing the cover onto a piece of equipment, user device, appliance etc. For example, the mounting feature may be a gripping component; such as a clip. Alternatively it may be an arrangement of slots and protrusion which allow the cover to slide onto corresponding slots and protrusions on a device, or a protrusion or overlapping edge, which allows the cover to clip onto the device. In other embodiments the mounting feature could comprise one or more apertures for receiving screws or bolts for fixing the cover to the piece of equipment, in which case the equipment may have corresponding apertures for receiving screws or bolts. In some embodiments the cover may be removable from the equipment or device so it can easily be change or replaced, while in other embodiments the cover is arranged to be permanently fixed to a device, e.g. it may be glued onto the device or fixed by an adhesive.

Preferably, the mounting feature is a resiliently deformable clip, more preferably the resiliently deformable clip is moulded from a polymer, optionally a thermoplastic polymer, and optionally moulded as part of the same piece of polymer as the rest of the cover. The resiliently deformable clip may be formed in the process of moulding the cover so that the cover and clip are formed of one and the same piece of polymer. This may create a stronger and more robust cover. It can also reduce the number of steps in the manufacture process. The clip may be a lever type clamp. In other embodiments, the clips may be fixed (non-deformable) clips. Clips can be useful when the cover is designed to be removable by a user.

Preferably, at least one mounting feature is a protrusion (i.e. a tab) for fitting into a corresponding recess or detent in the device or equipment to which the cover is designed to be fixed. In some embodiments, the protrusion is designed to be fitted into a recess on a main cover of the piece of equipment or device. Preferably the protrusion is moulded from a polymer, optionally a thermoplastic polymer. Again, it may be moulded as part of the same piece of polymer as the rest of the cover. This can allow the cover to be removed by a user. Tabs normally correspond to recesses/detents on the mating components of the equipment.

Any combination of clips, or recesses and detents may be used in the same cover.

In other preferred embodiments, the mounting feature is adhesive tape. The adhesive tape is applied to the inner surface of the cover and then the cover can be stuck onto the equipment. This is particularly useful when the cover is not designed to be removed by the user.

Optionally, the polymer comprises an ultraviolet (UV) stabiliser, which may protect the cover against long-term degradation from UV light. In particular, this can help ensure the appearance and colouring of the coatings (the reflective coating and/or the opaque coating) is maintained when the equipment is kept or used in the presence of sunlight.

In some embodiments, the equipment cover further comprises an area of increased light transmissivity for allowing equipment interface elements to be viewed. This can allow light transmitting elements or components in the equipment or device to be viewed through the cover, i.e. from beyond the outer surface. Such interface elements may include user interface elements, for example, lights, light emitting diodes (LEDs), displays, buttons, touch screens, and the area of increased light transmissivity may allow these to be viewed through the cover. Alternatively, or in addition, the interface elements could be sensors for detecting environmental parameters, such as heat, light and sound, or may be physical interface components for connecting to other pieces of equipment, such as sockets for power or data cables, e.g. USB ports, or pins for plugging the equipment or device directly into a (wall) power socket. The area of increased light transmissivity or transmittance could be provided by holes or gaps in the polymer cover, which could be provided in the moulding process, or cut out afterwards. Alternatively, the more light-transmissive area could be created by not coating the part of the inner surface intended to be placed above the particular component/element, so that the cover remains transparent/translucent in that location. Alternatively or in addition, the particular area of the polymer cover intended to be placed over the user interface element may not be textured. The area of increased light transmissivity may be formed by using a mask on the inner surface of the cover during the coating process to create a hole/shape where the coating is not applied directly to the inner surface of the cover to allow transmission or visibility of the interface element(s).

There is also described herein a device comprising: a processor; a communications interface; a power source or an interface for connecting to a power source; and an equipment cover as described above. The equipment cover may completely or partially cover the working components of the device, such as the processor and power source, and thus protect these from wear. The device could be a user device or appliance, such as a thermostat, sensor, switch, communications hub, power socket or plug. The device could also be a "smart" device and include a communications interface could be a wired or wireless interface, or could be a display or other user interface element.

The device may have has dimensions equal to or greater than 10 mm×10 mm×10 mm and/or less than 200 mm×200 mm×200 mm. In some embodiments it is preferred that the device has at least one narrow dimension, e.g. it is no thicker than 10-20 mm and/or no wider than 5-20 mm. This may be particularly advantageous for devices such as sensors.

The device may be arranged to be wall-mounted, e.g. secured to the wall with screws, nails, adhesive, or plugged into a wall-mounted power socket. For example, the device may be fixed to the wall using adhesive tape, particularly if it is small and lightweight. For example, sensors and buttons will generally use adhesive tape for mounting. Other devices or equipment may be screwed to the wall (e.g. wall sockets/light switches), or even placed in a cavity in the wall, so that the front of the cover is visible.

Preferably, the device further comprises an interface element or component that is accessible or viewable through the cover. For example, this may be a user interface elements such as a light, LED, display, buttons, touchscreen. The interface element could be a communication or power interface, such as a plug or a socket, or it may be a sensor, such as a temperature, heat or light sensor. There may be gaps in the cover to allow a component to be accessible or viewable, or the cover may be thinner over the element. Sometimes the cover may have an area with increased light transmissivity at the interface element, e.g. it may not be coated with the coating and/or may not be textured at the location of the interface element.

An embodiment may provide a material having a laminate structure which, as described herein may be formed into an equipment cover or housing or faceplate, for example for electronic components.

There is also described herein an equipment cover, or light-transmitting equipment cover, comprising: a substantially transparent or translucent polymer cover, optionally a thermoplastic polymer cover, having a textured outer surface and a generally smoother inner surface, wherein the texture depth of the textured outer surface is between 25 µm and 35 µm, wherein the thickness of the polymer between the outer surface and the inner surface is generally greater than or equal to 1.5 mm and smaller than or equal to 3 mm, and wherein the cover is arranged for attachment to a device with dimensions equal to or greater than 10 mm×10 mm×10 mm and less than or equal to 200 mm×200 mm×200 mm; a substantially transparent or translucent coating provided on the inner surface, wherein the transparent or translucent coating comprises reflective components making up at least 12% and no more than 18% of the volume of the coating; and a substantially opaque coating provided on the substantially transparent or translucent coating, wherein the combined thickness of the substantially transparent or translucent coating and the substantially opaque coating is at least 15 µm and not more than 25 µm.

In this embodiment, the polymer used for the moulding may have a transmissivity of at least 85% and not more than 95%.

Such an equipment cover can be robust, hard-wearing, suitably reflective, provide an appearance of depth, be lightweight, easy to manufacture, and easy to reproduce consistently.

The thickness of the polymer between the outer surface and the inner surface may be greater than or equal to 1.5 mm and smaller than or equal to 3 mm across the entire cover, or only across a substantial portion of the moulded light-transmitting cover, e.g. at least. 40%, 60%, or 90%.

The reflective components may be dispersed or suspended within the first, transparent/translucent coating, which can be applied directly to the inner surface of the polymer.

BRIEF DESCRIPTION OF THE DRAWINGS

Embodiments will now be described, by way of example only and with reference to the accompanying drawings.

DETAILED DESCRIPTION OF THE INVENTION

Figure 1:
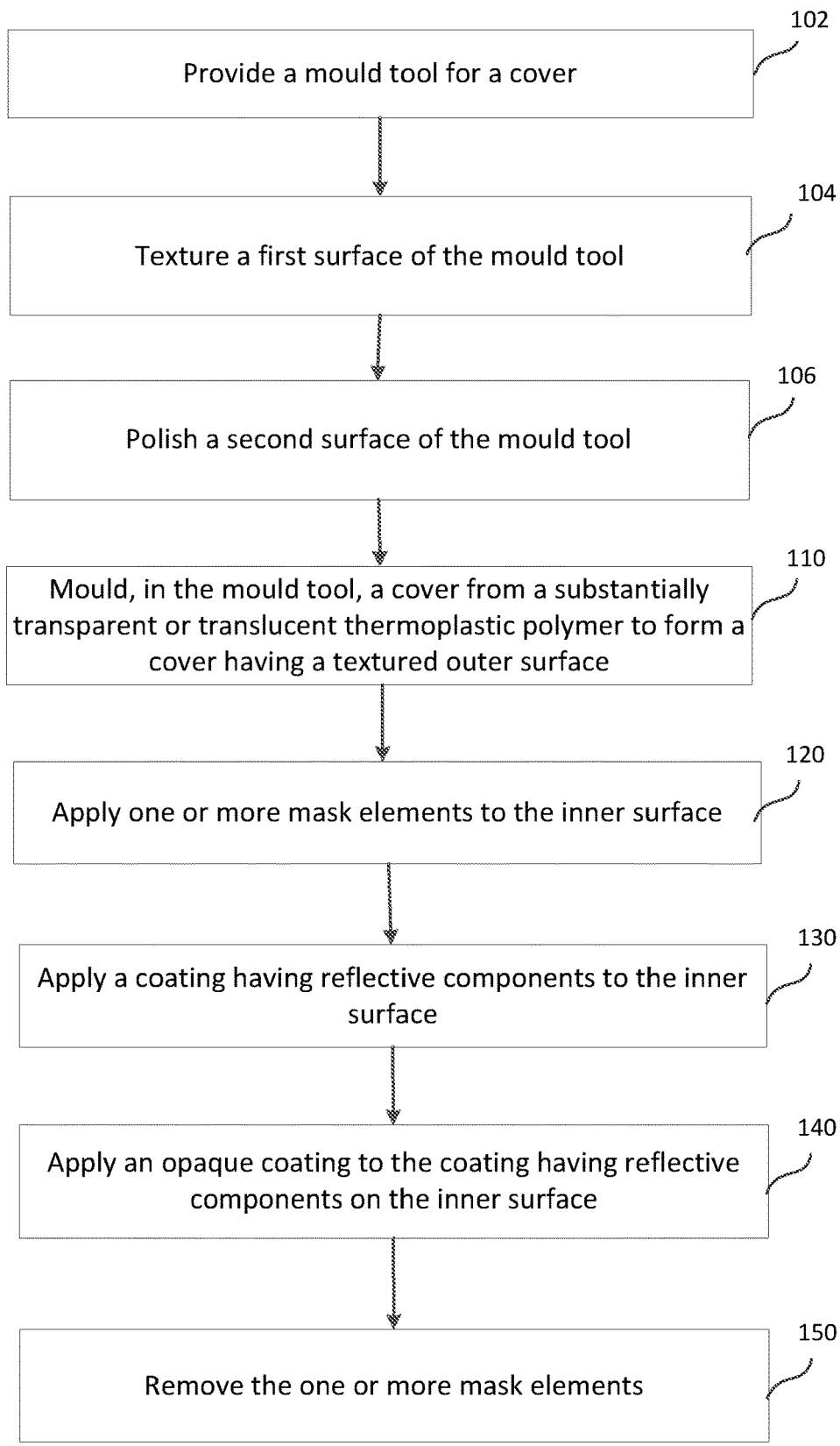
FIG. 1 illustrates an example method of making a light-transmitting equipment cover.

Referring to FIG. 1, a method 100 of making or manufacturing an equipment cover, also termed herein a light-transmitting equipment cover, will now be described. The cover described in the present embodiment is manufactured using a thermoplastic polymer, but other covers may be manufactured using other polymers as detailed elsewhere in the application.

At step 102, a mould tool for a cover is provided. The mould tool has a cavity that allows molten thermoplastic to be moulded to substantially the desired shape of the light-transmitting equipment cover. The cover will be moulded into such a shape that it is suitable for covering at least part of a piece of equipment, e.g. it may be the front plate for a sensor, thermostat, communications hub, wall socket, plug etc. Where the equipment has physical interface elements that must be accessible outside the cover (such as microphones or passive infrared, PIR, sensors, plug pins etc.) the mould tool may take this into account so that the thermoplastic polymer moulded in the tool has a corresponding aperture.

At step 104 a first surface of the mould tool, or moulding die, is textured. If the mould tool is made of metal, a thermal stability layer may be provided between it and the thermoplastic when in use to avoid rapid cooling of the thermoplastic which could result in non-uniform residual stresses, voids, rough surfaces and porosity in the thermoplastic. If a thermal stability layer is used, this would be textured in the same way as the mould tool is when there is no thermal stability layer in place. Parameters of the injection moulding process, such as pressure, time, temperature, plastic viscosity and gate size may be adjusted to achieve the desired transmittance properties of the thermoplastic once it has set.

In this example texturing the mould tool is achieved through chemical etching or spark erosion, which creates an uneven and irregular texture. The first surface of the mould tool corresponds to the outer surface of a cover that can be formed in the mould tool.

At step 106, a second surface of the mould tool (corresponding to the inner surface of the light-transmitting cover) is polished to create a smooth profile. The polishing may be, for example, vapour polishing, mechanical machine polishing or buffing (using e.g. a spinning cotton wheel with cutting compound).

At step 110, a cover is moulded from a transparent or translucent thermoplastic polymer. In this example the cover is injection moulded from a transparent polycarbonate. The thermoplastic polymer used is in the form of pellets, which are heated and injected into the moulding tool. The outer surface of the thermoplastic is textured in the moulding process by the textured first surface of the moulding tool, i.e. the outer surface of the thermoplastic polymer cover is rough and has an uneven or irregular profile. In other words it is not smooth. The cover will be moulded into such a shape that it is suitable for covering at least part of a piece of equipment, e.g. it may be the front plate for a sensor, thermostat, communications hub, wall socket, plug etc. Thus the textured outer surface of the moulded thermoplastic polymer is achieved by the corresponding textured first surface of the mould tool. The inner surface of the cover (normally the surface opposing the outer surface) attains its generally smoother profile by the corresponding polished second surface of the moulding tool. Thus the inner surface is comparatively smoother than the textured outer surface. Injection moulding is a well-established manufacturing process, however the specific temperatures, pressures, setting times etc. required when forming components depends on conditions such as the specific material used.

In step 120, one or more mask elements are applied to the inner surface of the thermoplastic polymer cover. The mask element(s) are either in a location where material is going to be removed from the cover (for example to make a physical access point for a user interface such as a button), or in the location of the cover that will be directly above visible user interface elements in the equipment, or device, that are not required to be physically accessible through the cover (and in some cases may require the protection afforded by the cover). These may be e.g. light sensors or LEDs. The mask is applied so that when the later coating steps are applied these areas of the thermoplastic polymer are not coated. Therefore in the first case, saving coating material when sections are removed which would have otherwise been coated, and in the second case when the cover is installed on the equipment, the user interface elements remain visible.

In step 130 a reflective coating is applied to the generally smoother inner surface. In this case the reflective coating is screen printed onto the inner surface. While paints, inks or other suitable coating substances may be used, as set out above, in the present embodiment, the reflective coating is a transparent lacquer with reflective components dispersed within it. The reflective components are pearlescent mica powder, which make up 15% by volume of the reflective coating. This layer provides a lustre/reflectivity to the cover. The reflective coating is applied to a thickness of 8 to 10 microns.

In step 140 a substantially opaque coating is applied to the inner surface, i.e. on top of the reflective coating applied in step 130. In this example the opaque coating is ink. The ink is screen printed onto the inner surface. The opaque coating ink applied in step 140 is coloured and due to the transparence/translucence of the reflective coating applied in step 130, this colour shows through to the outer surface of the cover.

At step 140 the mask elements applied in step 120 are removed. This may be a physical or a chemical process.

Although the manufacture of an equipment cover has been described with reference to FIG. 1 by way of a specific example, alternative materials and processes may be used and some of the steps may be omitted. Some of the alternatives are discussed below.

For example, in some embodiments, instead of polycarbonate, another suitable polymer is used, for example polyester, polypropylene, polyethylene or acrylic.

As an alternative to chemical etching, at step 104 spark erosion may be used to texture the surface of the mould tool.

Where the equipment has physical interface elements that must be accessible outside the cover, apertures or holes in the polymer layer may alternatively be cut out after the cover has been moulded, before or after the coating process.

Alternatively, at step 110 other forms of moulding may be used, for example blow moulding, or the cover may be formed by extrusion.

At step 130, the reflective components may be formed of metals, alloys, composites, polymers, glass or other reflective materials, and may be in various forms such as flakes, powder or scrap, as set out above.

The screen printing in steps 130 and 140 could be replaced with other application methods, e.g. spray-printing.

In some circumstances, instead of separate coatings being applied in steps 130 and 140 above, only one coating is applied. In this case, the reflective coating applied in step 130 may have reflective components dispersed within a substantially opaque coating, and then step 140 is omitted.

Instead of using a moulded thermoplastic polymer, it may also be possible to use a thermosetting resin.

Figure 2:
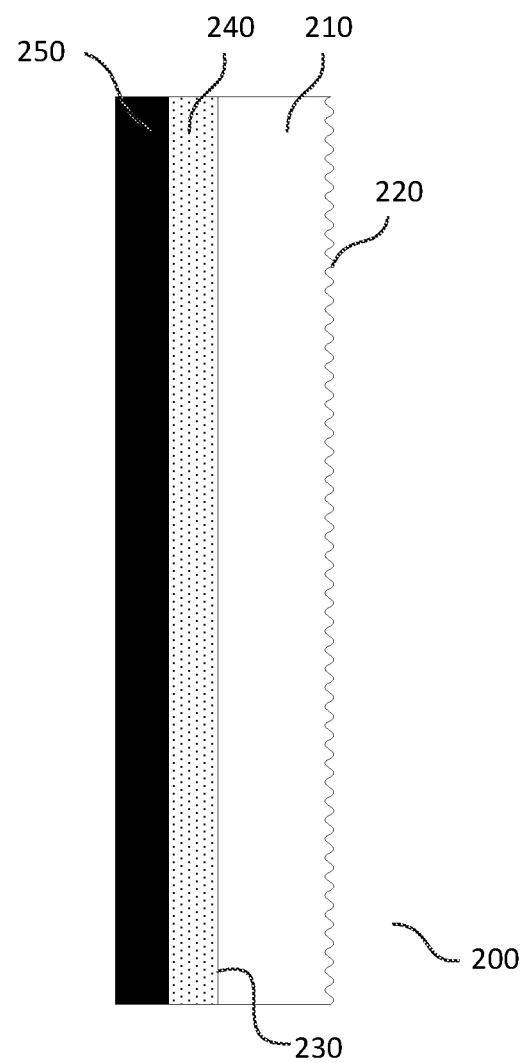
FIG. 2 illustrates an example of a light-transmitting equipment cover.

FIG. 2 shows a cross-sectional view of an equipment cover 200. The cover 200 is formed of a transparent thermoplastic polymer layer 210. In this case the thermoplastic polymer layer 210 is formed of polycarbonate of thickness 2 mm, which has been injection moulded. It has been found that thicknesses between 1.5 mm and 3.0 mm provide the desired characteristics for an equipment cover. In particular, thicknesses between (and including) 2.0 mm and 2.5 mm have been found to be thick enough to be robust and protect the working parts of the equipment from damage, whilst still providing optimal reflectivity and a perception of depth to the surface of the cover, and not adding significantly to the weight or volume of the equipment.

The outer surface 220 of the thermoplastic polymer layer 210 is textured in the injection moulding process. The texture depth in this example is 30 micrometres. This means that the average total height difference between the highest peak and the lowest valley in a sample length is 30 micrometres.

The inner surface 230 of the thermoplastic polymer layer 210 is created because the corresponding area of the moulding tool used has a polished surface, which results in the cover 200 having a smooth inner surface 230. The smooth inner surface 230 is covered with a first coating 240 containing reflective elements. In this example the coating 240 is an ink comprising 15% by volume mica powder suspended in a transparent lacquer that has been screen printed onto the smooth inner surface 230.

On top of the coating containing reflective elements 240 is an opaque coating 250, which has been screen printed onto the first reflective coating 240.

In this example, the total thickness of the coating containing reflective elements 240 and the opaque coating 250 is 20 micrometres.

Figure 3:
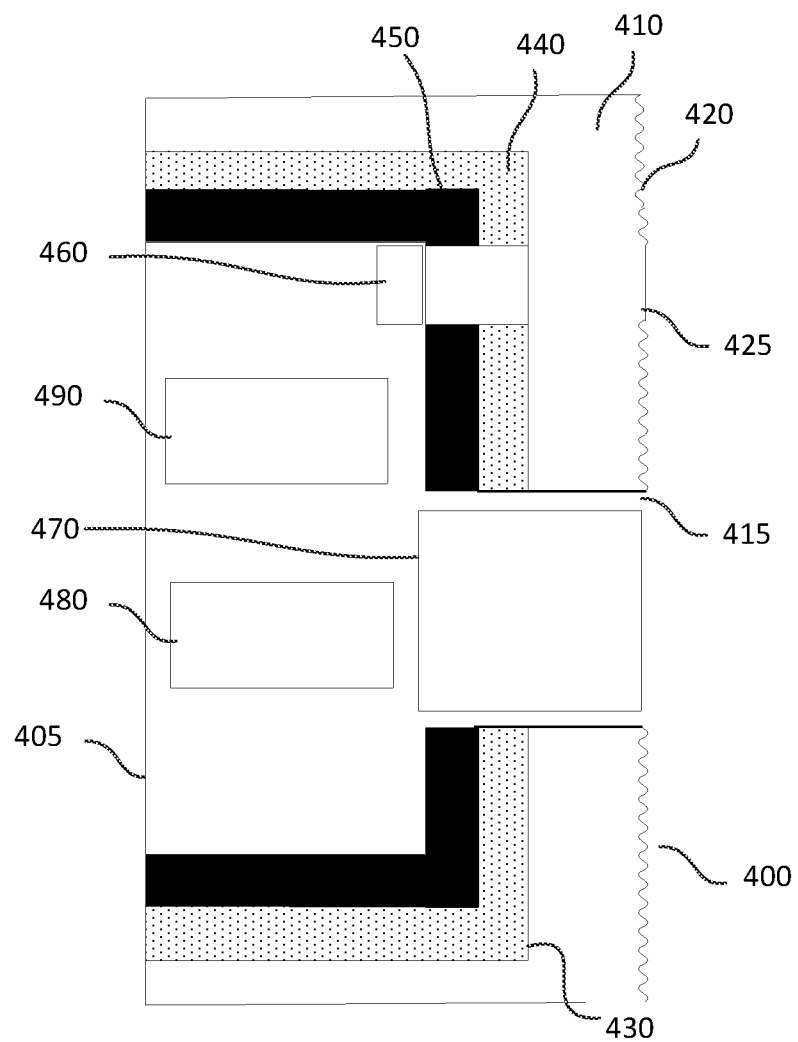
FIG. 3 illustrates an example of a device with a light-transmitting equipment cover and interface components.

FIG. 3 shows the cross-section of a device 405 that comprises a light-transmitting equipment cover 400. The equipment cover 400 is formed of a transparent/translucent polymer cover 410, having a textured outer surface 420 and a smoother inner surface 430. The inner surface 430 is coated with a substantially transparent/translucent coating 440 containing reflective components, which in turn is coated with an opaque coating 450. The device 405 contains a power source 480 and a processor 490. The device 405 also has a user interface element 460 and a physical interface component 470.

The section of the polymer cover directly in front of the user interface component 460 is not coated with the transparent/translucent coating 440 containing reflective components, or with the opaque coating 450, so that the user interface component 460 is visible through the cover 400. The textured outer surface 420 also has an untextured, or smooth, section 425 above the user interface component 460 to improve visibility of the user interface component 460. In this example, the user interface element 460 is an LED, so the LED is visible through the cover.

The polymer cover 410 has a hole 415 in the location of the physical interface component 470, so that the physical interface component 470 is accessible through the cover 400. The polymer cover 410 may be moulder containing the hole 415, or the hole 415 may be punched or cut in the polymer cover 410 after the cover 410 has been moulded. In this example the physical interface component 470 is a pin socket for plugging in an electric power pin. Due to the gap 415 in the thermoplastic polymer 410 above the physical interface component 470, it is possible to plug an electric power pin into the pin socket.

Figure 4A:
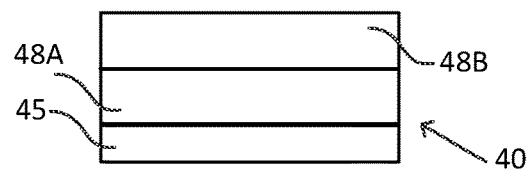
FIG. 4A shows an example device with a light-transmitting equipment cover from a top view.

FIG. 4A shows an example device 40 with a light-transmitting equipment cover 45 from a top view. The device 40 has a conventional main housing 48A, 48B, and only the front of the device 40 is formed of the light-transmitting cover 45, as described above. The main housing is formed of a front part 48A and a rear part 48B. In this case the device is a contact sensor.

Figure 4B:
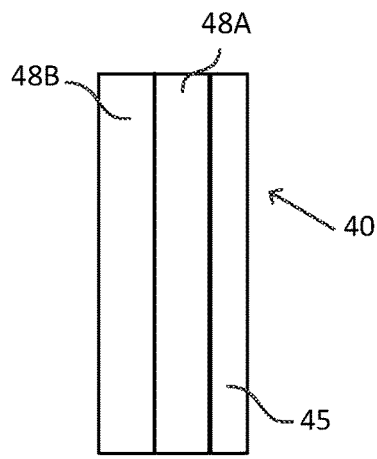
FIG. 4B shows the example device of FIG. 4A from a side view.

FIG. 4B shows the example device 40 of FIG. 4A from the side.

Figure 4C:
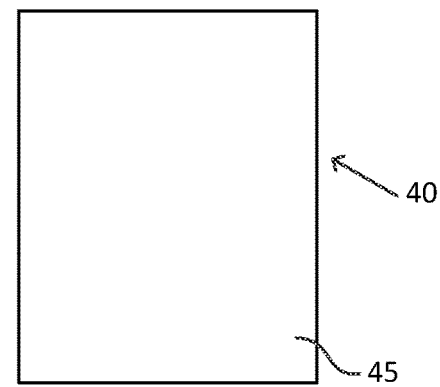
FIG. 4C shows the example device of FIG. 4A from a front view.
Figure 4D:
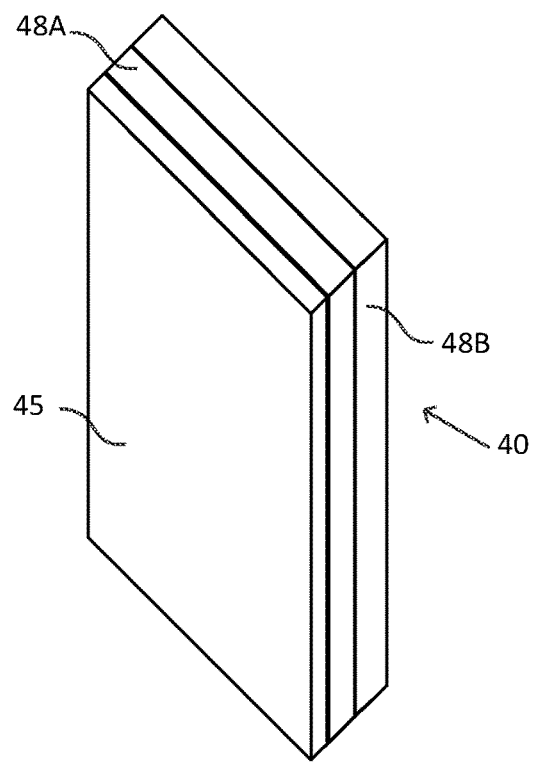
FIG. 4D shows a perspective view of the example device of FIG. 4A.

FIG. 4C shows the device 40 of from a front view and FIG. 4D shows a perspective view of the device 40.

Figure 5A:
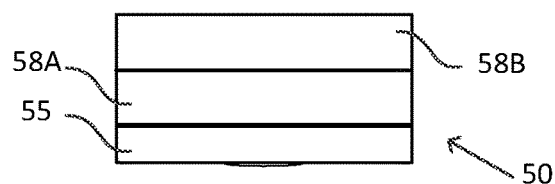
FIG. 5A shows another example device with a light-transmitting equipment cover from a top view.

FIG. 5A shows an example device 50 with a light-transmitting equipment cover 55 from a top view. The device 50 has a conventional main housing comprising a front part 58A and a back part 58B. Only the very front panel of the device 50 is covered with the light-transmitting cover 55, of the type described above. In this example the device 50 is a motion sensor.

Figure 5B:
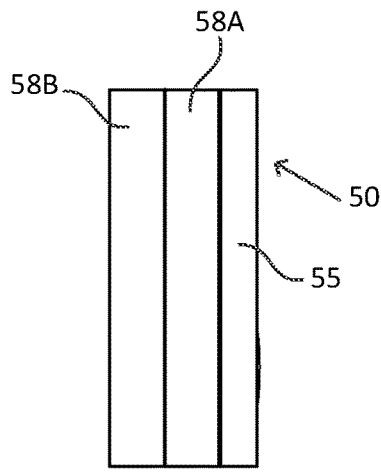
FIG. 5B shows the example device of FIG. 5A from a side view.
Figure 5C:
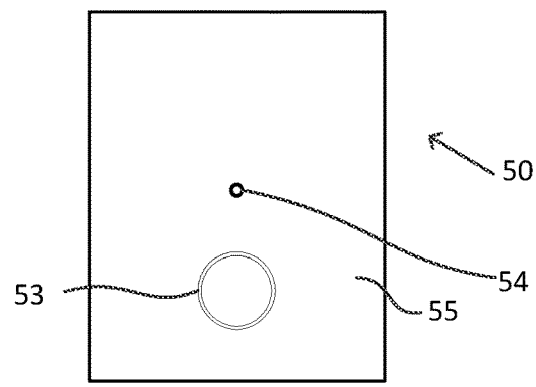
FIG. 5C shows the example device of FIG. 5A from a front view.

FIG. 5B shows the device 50 of FIG. 5A from a side view. FIG. 5C shows the device 50 of FIG. 5A from a front view. The contact sensing element 53 of device 50 is on the front of the device 50, as can be seen in FIG. 5C. The light-transmitting cover 55 has an aperture for allowing the motion sensing element 53 access to the local environment. The device 50 also has an LED 54 on the front face. The LED 54 is below the surface of the light-transmitting cover 55, however the light-transmitting cover 55 has a portion of increased light transmissivity so that the LED 54 can be viewed. In this example, the area of the light-transmitting cover 55 directly covering the LED 54 has not been coated with a coating containing reflective components, or with an opaque coating.

Figure 5D:
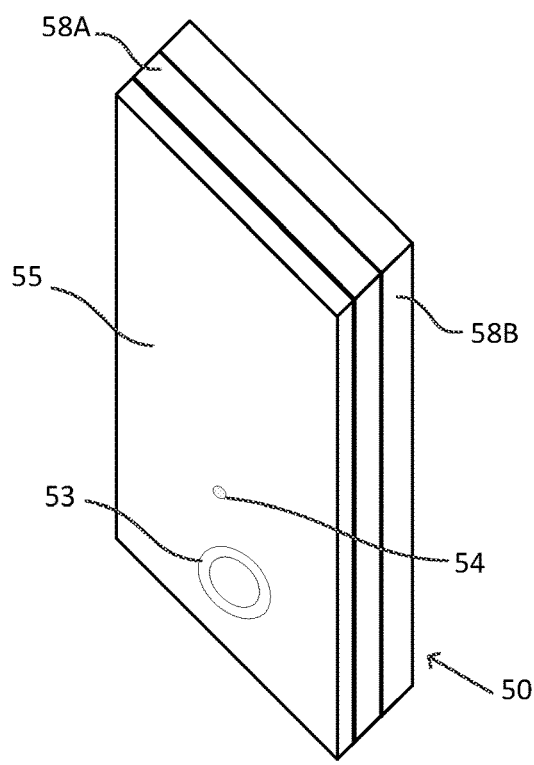
FIG. 5D shows a perspective view of the example device of FIG. 5A.

FIG. 5D shows a perspective view of the example device of FIG. 5A.

Modifications to this specific example are contemplated. For example. in one embodiment the section of the outer surface above the user interface component may in fact be textured.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method of making an equipment cover, the method comprising:
   moulding a cover from a transparent or translucent polymer in a mould tool having a textured surface to form a cover having a textured outer surface corresponding to the textured surface of the mould tool, and a generally smoother inner surface;
   applying a coating having reflective components to the inner surface, wherein the coating having reflective components is transparent or translucent and comprises reflective components dispersed within a transparent or translucent coating, and wherein the reflective components comprise at least one of:
   metallic components; and
   mica powder, flakes or scrap; and
   after applying the coating having reflective components to the inner surface, applying a further coating to the inner surface, wherein the further coating is opaque.

2. A method according to claim 1, wherein the reflective components comprise at least 10% by volume of the coating, and wherein the reflective components comprise not more than 20% by volume of the coating.

3. A method according to claim 1, wherein:
   the polymer has a transmissivity of at least 85% and not more than 95%.

4. A method according to claim 1, wherein moulding a cover from a transparent or translucent polymer comprises moulding the cover in a mould tool, and wherein the method further comprises:
   texturing a surface of the mould tool corresponding to the textured outer surface of the cover.

5. A method according to claim 4, wherein texturing the surface of the mould tool comprises etching the surface by chemical etching or spark erosion.

6. A method according to claim 4, wherein the method further comprises:
polishing the surface of the mould tool corresponding to the inner surface of the polymer cover to provide the generally smoother profile of the inner surface.

7. A method according to claim 1, wherein applying a coating to the inner surface comprises not applying the coating to an area of the inner surface for allowing a user interface element to be visible.

8. A method according to claim 1, wherein the textured outer surface has a texture depth at least 20 μm and not more than 40 μm.

9. A method according to claim 1, wherein the thickness of the coating having reflective components is greater than 5 μm and less than 20 μm.

10. A method according to claim 1, wherein the reflective components comprise mica powder.

11. A method according to claim 1, wherein the textured outer surface has an irregular surface roughness.

12. An equipment cover comprising:
a transparent or translucent polymer cover having a textured outer surface and a generally smoother inner surface, wherein the cover is formed by moulding the transparent or translucent polymer in a mould tool having a textured surface corresponding to the textured outer surface of the cover;
a coating containing reflective components provided on the inner surface, wherein the coating having reflective components is transparent or translucent and comprises reflective components dispersed within a transparent or translucent coating, and wherein the reflective components comprise at least one of:
metallic components; and
mica powder, flakes or scrap; and
a further coating over the coating containing reflective components, wherein the further coating is opaque.

13. An equipment cover according to claim 12, further comprising:
one or more mounting features for fixing the cover onto a piece of equipment, wherein at least one mounting feature is a resiliently deformable clip and wherein the resiliently deformable clip is moulded from a polymer.

14. An equipment cover according to claim 12, further comprising:
an area of increased light transmissivity for one or more equipment interface elements.

15. An equipment cover according to claim 12, wherein the polymer has a transmissivity of at least 85% and/or not more than 95%.

16. An equipment cover according to claim 12, wherein the thickness of the coating having reflective components is greater than 1 μm and less than 50 μm.

17. An equipment cover according to claim 12, wherein the combined thickness of the coating having reflective components and the further coating is at least 10 μm and less than 30 μm.

18. A device comprising:
a processor;
a power source or an interface for connecting to a power source; and
an equipment cover according to claim 12.

19. An equipment cover according to claim 12,
wherein the texture depth of the textured outer surface is between 25 μm and 35 μm,
wherein the thickness of the polymer between the outer surface and the inner surface is generally greater than or equal to 1.5 mm and smaller than or equal to 3 mm, and
wherein the cover is arranged for attachment to a device with dimensions equal to or greater than 10 mm×10 mm×10 mm and less than or equal to 200 mm×200 mm×200 mm
wherein the transparent or translucent coating comprises reflective components making up at least 12% and no more than 18% of the volume of the coating; and
wherein the combined thickness of the transparent or translucent coating and the further coating is at least 15 μm and not more than 25 μm.

* * * * *